(12) United States Patent
McHatet

(10) Patent No.: US 10,014,095 B1
(45) Date of Patent: Jul. 3, 2018

(54) CABLE WITH MAGNETIC MOUNTING ASSEMBLY

(71) Applicant: Hamid McHatet, Miami, FL (US)

(72) Inventor: Hamid McHatet, Miami, FL (US)

( * ) Notice: Subject to any disclaimer, the term of this patent is extended or adjusted under 35 U.S.C. 154(b) by 25 days.

(21) Appl. No.: 15/486,694

(22) Filed: Apr. 13, 2017

Related U.S. Application Data

(63) Continuation-in-part of application No. 15/483,308, filed on Apr. 10, 2017.

(51) Int. Cl.
*H01R 24/64* (2011.01)
*H01B 7/40* (2006.01)

(52) U.S. Cl.
CPC ..................... *H01B 7/40* (2013.01)

(58) Field of Classification Search
USPC .............. 307/104; 191/12.4; 242/378; 439/4
See application file for complete search history.

(56) References Cited

U.S. PATENT DOCUMENTS

| | | | | |
|---|---|---|---|---|
| 4,378,473 A * | 3/1983 | Noorigian | .......... | B65H 75/4428 191/12.2 R |
| 4,897,873 A * | 1/1990 | Beutler | ............... | H04M 1/0216 16/292 |
| 6,254,025 B1 * | 7/2001 | Liao | .................... | B65H 75/4434 242/378.1 |
| 6,305,632 B1 * | 10/2001 | Hwang | ................ | B65H 75/486 242/372 |
| 7,959,444 B2 * | 6/2011 | Corless | .................. | H01R 13/72 439/35 |
| 9,577,467 B1 * | 2/2017 | Karanikos | ............... | H02J 7/025 |
| D786,876 S * | 5/2017 | Huang | .......................... | D14/433 |
| 2002/0053622 A1 * | 5/2002 | Kagel | ..................... | A45F 5/004 242/379 |
| 2009/0243396 A1 * | 10/2009 | Randall | ............. | H01R 13/2421 307/104 |
| 2011/0018360 A1 * | 1/2011 | Baarman | ................. | H02J 5/005 307/104 |
| 2011/0071597 A1 * | 3/2011 | Aghassian | ......... | A61N 1/37235 607/61 |
| 2012/0048983 A1 * | 3/2012 | Bianco | ................ | B60L 11/1818 242/388.9 |
| 2012/0112553 A1 * | 5/2012 | Stoner, Jr. | ............... | H02J 5/005 307/104 |

(Continued)

*Primary Examiner* — William H Mayo, III
*Assistant Examiner* — Krystal Robinson
(74) *Attorney, Agent, or Firm* — Albert Bordas, P.A.

(57) ABSTRACT

A cable with magnetic mounting assembly having a cover assembly, a magnet assembly, a cable support assembly, and a friction member. The cover assembly has a base wall, a lower lateral wall with lower cutouts, a concave face, and an upper lateral wall with upper cutouts. A hinge joins the lower lateral wall and the upper lateral wall. The magnet assembly has a magnet and a magnet support. The cable support assembly has first and second support spacers. The friction member has a ring base with elongated protrusions. When assembled, the cover assembly houses the cable support assembly, the magnet assembly, and the friction member. First and second support spacers define a cavity between them that aligns with holes defined by the lower and upper cutouts to receive a cable therethrough. The concave face is mounted onto any surface attracted to the magnet.

16 Claims, 4 Drawing Sheets

(56) References Cited

U.S. PATENT DOCUMENTS

2014/0035381 A1* 2/2014 Chen .................. H02J 5/005
　　　　　　　　　　　　　　　　　　　307/104
2015/0290373 A1* 10/2015 Rudser ................ A61M 1/1086
　　　　　　　　　　　　　　　　　　　623/3.27

* cited by examiner

CABLE WITH MAGNETIC MOUNTING ASSEMBLY

BACKGROUND OF THE INVENTION

1. Field of the Invention

The present invention relates to electronic accessories, and more particularly, to cables with magnetic mounting assemblies.

2. Other Related Applications

The present application is a continuation-in-part of pending U.S. patent application Ser. No. 15/483,308, filed on Apr. 10, 2017, which is hereby incorporated by reference.

3. Description of the Related Art

Applicant is not aware of any cable with magnetic mounting assembly having the novel features of the present invention.

SUMMARY OF THE INVENTION

The present invention is a cable with magnetic mounting assembly, comprising a cover assembly, a magnet assembly, a cable support assembly, and a friction member.

The cover assembly comprises a base wall, and a lower lateral wall having a clasp and lower cutouts. The cover assembly further comprises a concave face and an upper lateral wall having a protrusion and upper cutouts. The concave face comprises an edge having elongated slots. A hinge joins the lower lateral wall and the upper lateral wall. The cover assembly closes by positioning the clasp onto the protrusion.

The magnet assembly comprises a magnet and a magnet support. The cable support assembly comprises first and second support spacers. The friction member comprises a ring base with elongated protrusions. The cover assembly covers the cable support assembly, the magnet assembly, and the friction member. The magnet is positioned onto the magnet support, and the magnet support is positioned onto the cable support assembly. The concave face is positioned onto the friction member, covering the magnet, and the elongated protrusions protrude from the elongated slots. The cover assembly comprises a notch, which fits onto the ring base.

The first and second support spacers define a cavity between them. The lower and upper cutouts define a hole that aligns with the cavity to receive a cable therethrough. The concave face is mounted onto any surface attracted to the magnet.

It is therefore one of the main objects of the present invention to provide a cable with magnetic mounting assembly.

It is another object of this invention to provide a cable with magnetic mounting assembly, which can be positioned over any surface attracted to a magnet.

It is another object of this invention to provide a cable with magnetic mounting assembly that is compact and of high quality.

It is another object of this invention to provide a cable with magnetic mounting assembly, which is of a durable and reliable construction.

It is yet another object of this invention to provide a cable with magnetic mounting assembly that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
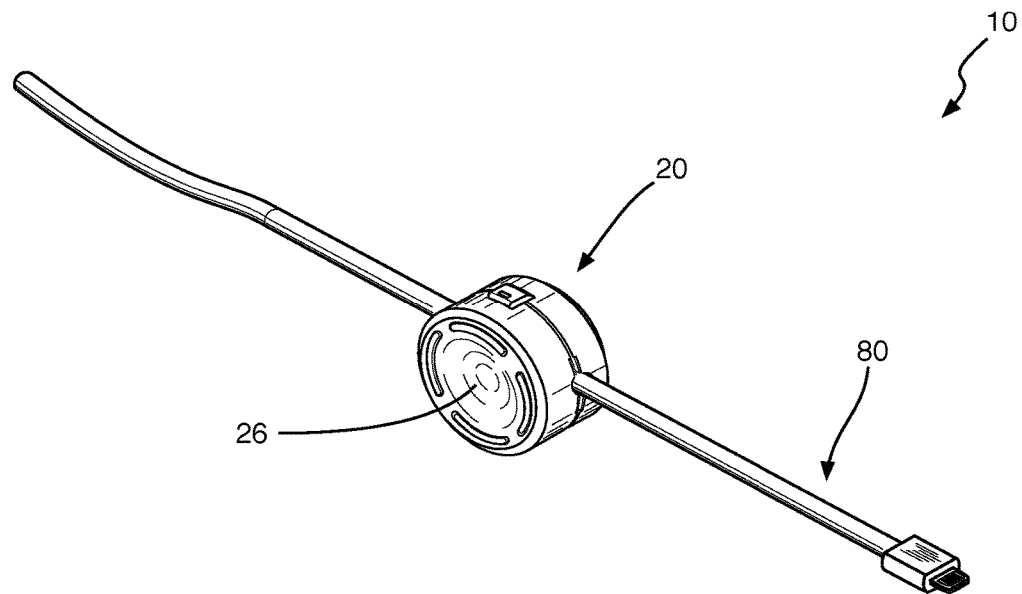
FIG. 1 is an isometric view of the present invention.

Referring now to the drawings, the present invention is a cable with magnetic mounting assembly and is generally referred to with numeral 10. It can be observed that it basically comprises cover assembly 20, magnet assembly 50, cable support assembly 60, and friction member 70.

Figure 2:
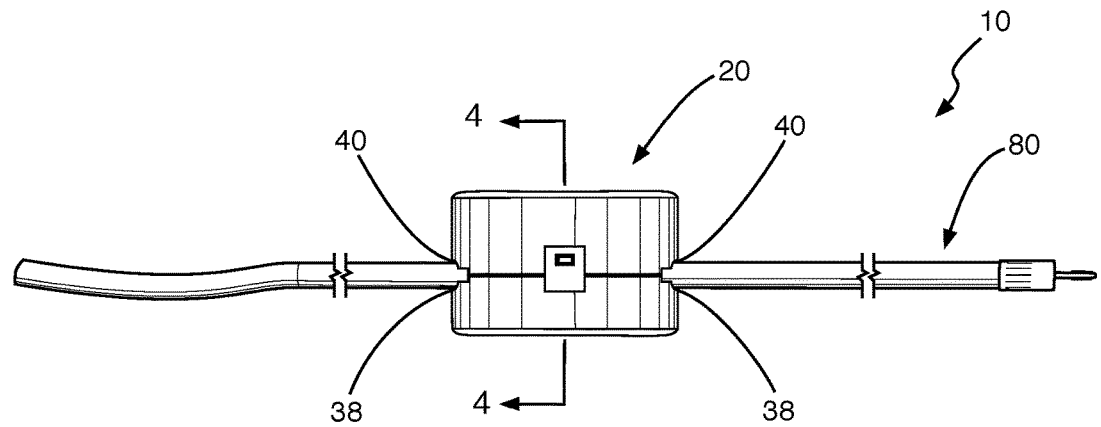
FIG. 2 is a side view of the present invention.

As seen in FIGS. 1 and 2, cable with magnetic mounting assembly 10 further comprises cable 80 having cover assembly 20 secured thereon. Lower cutouts 38 and upper cutouts 40 define a hole at cover assembly 20 to receive cable 80 therethough.

Figure 3:
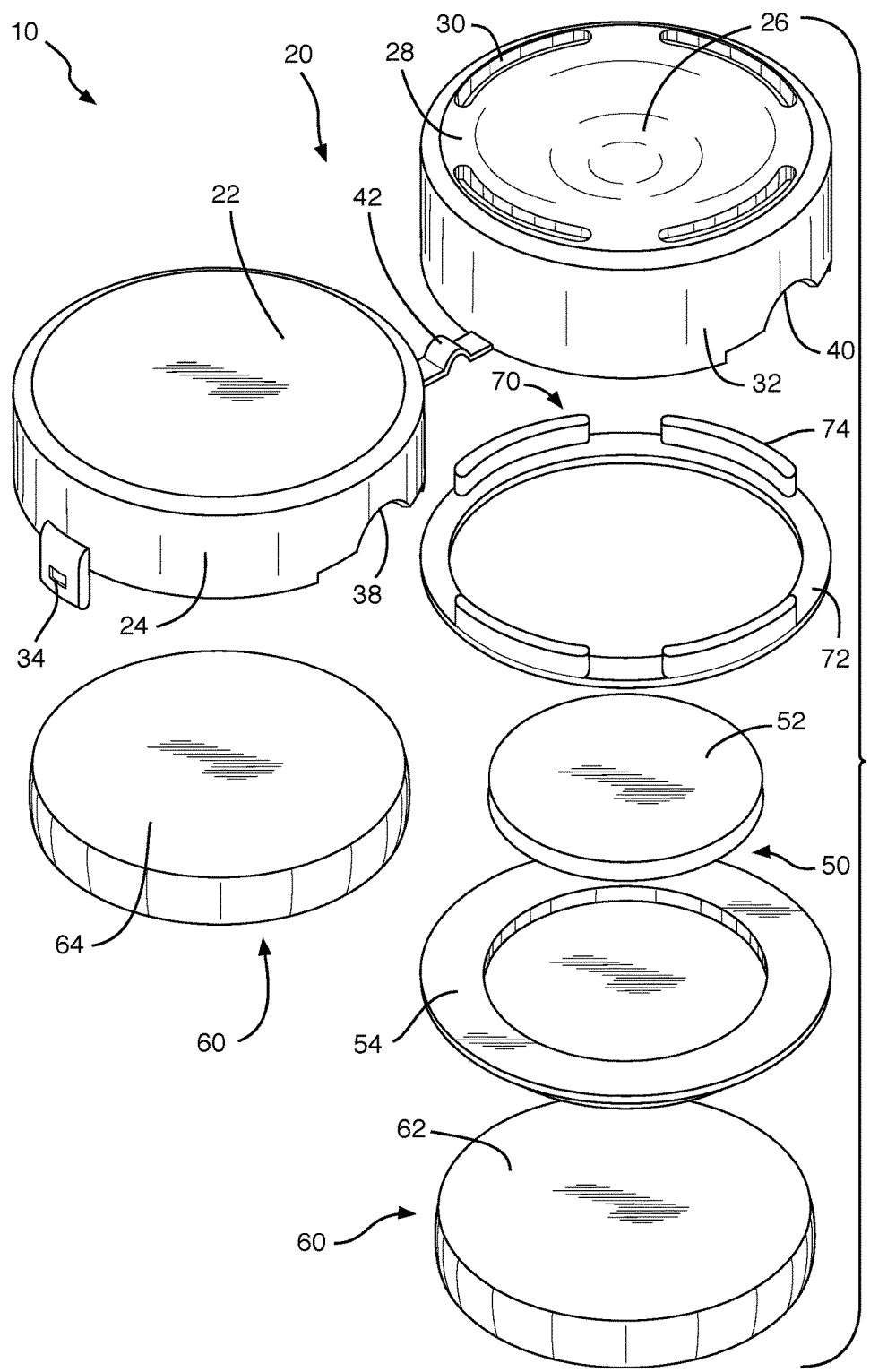
FIG. 3 is an exploded view of the present invention.
Figure 4:
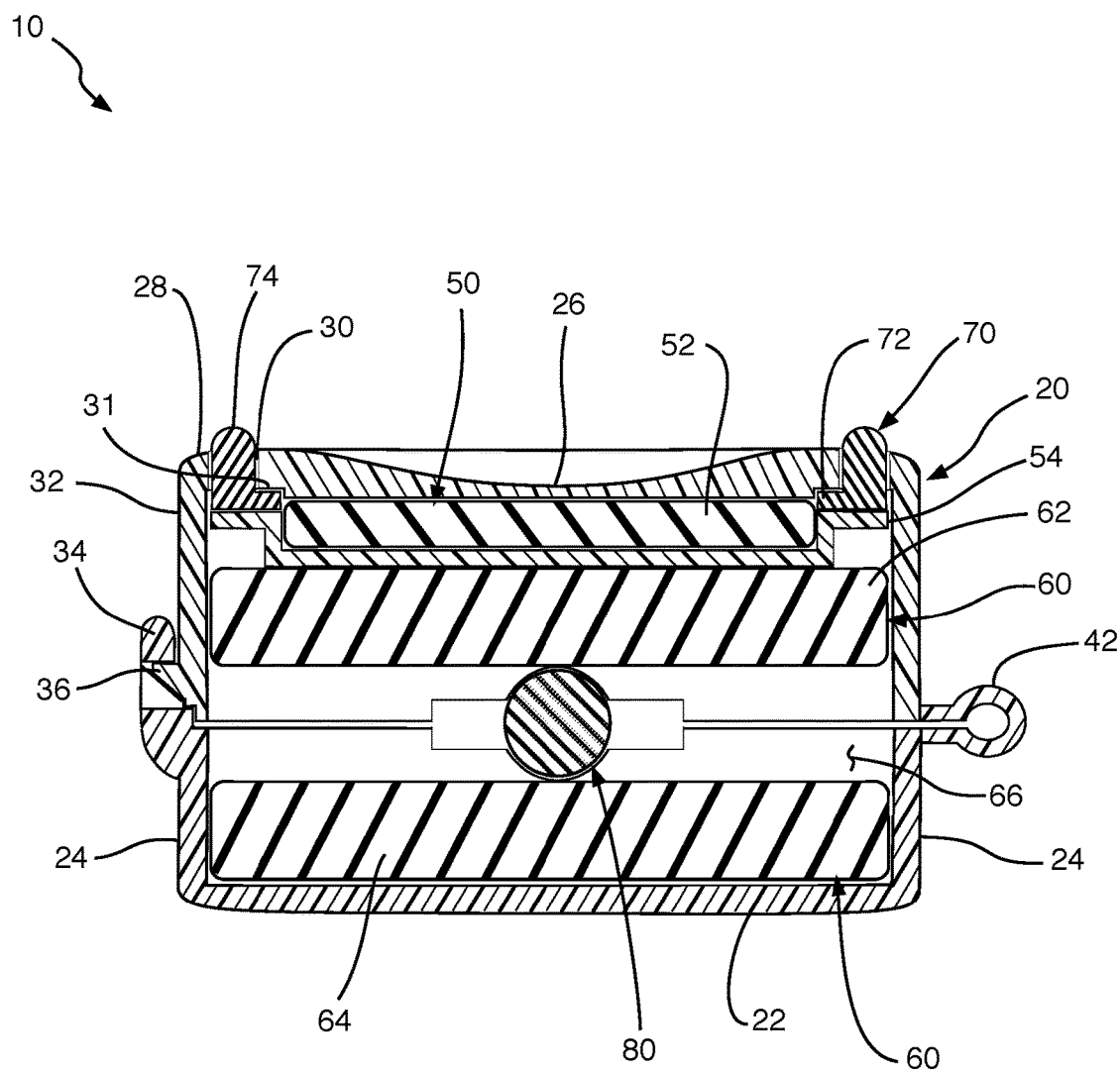
FIG. 4 is a cut view of the present invention taken along the lines 4-4 as seen in FIG. 2.

As seen in FIG. 3, cover assembly 20 comprises base wall 22, lower lateral wall 24, concave face 26, and upper lateral wall 32. Extending from base wall 22 is lower lateral wall 24 that comprises clasp 34 and lower cutouts 38. Concave face 26 has edge 28 with elongated slots 30. Extending from edge 28 is upper lateral wall 32 that comprises protrusion 36, seen in FIG. 4, and upper cutouts 40. Hinge 42 joins lower lateral wall 24 and upper lateral wall 32. Magnet assembly 50 comprises magnet 52 secured by magnet support 54, whereby magnet 52 snaps into, is glued, or otherwise secured within a cavity formed by magnet support 54. Cable support assembly 60 comprises first support spacer 62 and second support spacer 64 to secure cable 80, as seen in FIG. 4, positioned between them. Friction member 70 comprises ring base 72 having elongated protrusions 74. Friction member 70, and particularly elongated protrusions 74, are made of rubber, a rubber composition, or otherwise a material with similar rubber characteristics for friction. Elongated slots 30 receive respective elongated protrusions 74 therethrough.

As seen in FIG. 4, friction member 70 is positioned internally within cover assembly 20 and abuts an opposite side of concave face 26 until elongated protrusions 74 protrude from respective elongated slots 30 a predetermined amount. Cover assembly 20 comprises notch 31 on the opposite side of concave face 26. Notch 31 snaps or fits onto ring base 72. Magnet 52 is positioned onto magnet support 54, and magnet support 54 abuts ring base 72 of friction member 70.

In a preferred embodiment, upper lateral wall 32 has a first predetermined inside diameter, and first support spacer 62 has a first predetermined outside diameter. The first predetermined inside diameter is slightly larger than the first predetermined outside diameter to allow first support spacer 62 to snap within upper lateral wall 32 and abut magnet support 54. Similarly, lower lateral wall 24 has a second predetermined inside diameter, and second support spacer 64 has a second predetermined outside diameter. The second predetermined inside diameter is slightly larger than the second predetermined outside diameter to allow second support spacer 64 to snap within lower lateral wall 24. In a preferred embodiment, the first and second predetermined inside diameters are equivalent, or approximately equivalent, and the first and second predetermined outside diameters are equivalent, or approximately equivalent.

When assembled, cover assembly 20 houses magnet assembly 50, cable support assembly 60, and friction member 70. Cover assembly 20 closes by positioning clasp 34 onto protrusion 36. When closed, first support spacer 62 and second support spacer 64 define cavity 66 between them, and the holes defined by lower cutouts 38 and upper cutouts 40, seen in FIG. 2, align with cavity 66 to receive cable 80 therethrough.

Figure 5:
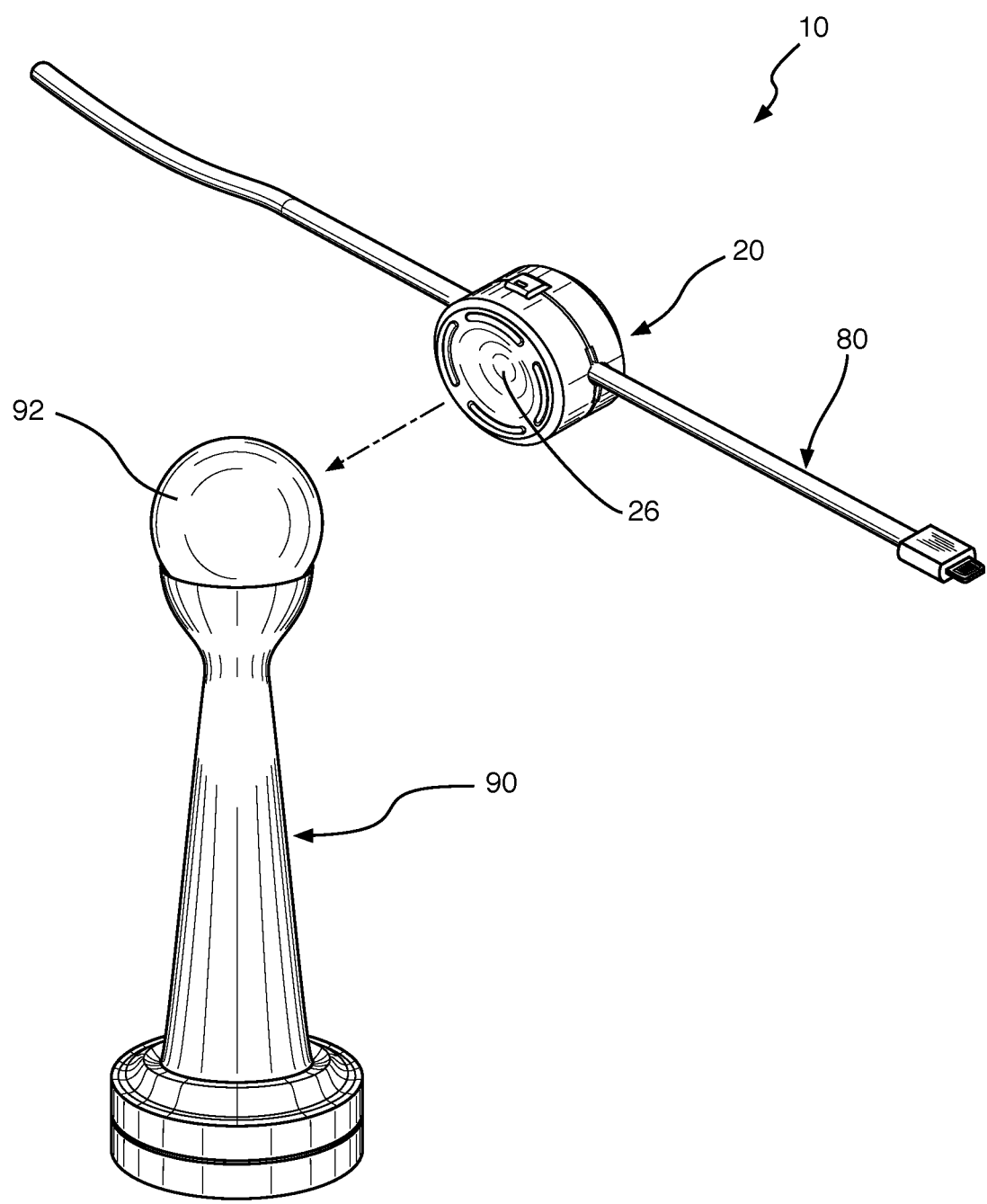
FIG. 5 is an isometric view of the present invention being mounted onto a base assembly.

As seen in FIG. 5, cable with magnetic mounting assembly 10 may be mounted by concave face 26 onto any surface attracted to magnet 52. In a preferred embodiment, concave face 26 is mounted onto base assembly 90 having metal sphere 92.

Although only a section of cable 80 is illustrated, it is understood that cable 80 may be any electronics cord utilized for charging computers such as, but not limited to, smart phones, tablets, electronic devices, electronic accessories, cameras, etc. In addition, cable 80 may be any electronics cord utilized for transferring data from one electronic device to another, and/or one computer to another, such as, but not limited to, smart phones, tablets, electronic devices, electronic accessories, cameras, etc.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cable with magnetic mounting assembly, comprising:
    A) a cover assembly comprising a base wall and a lower lateral wall, said lower lateral wall comprises a clasp, said cover assembly further comprises a concave face and an upper lateral wall, said concave face comprises a perimeter edge having elongated slots;
    B) a magnet assembly;
    C) a cable support assembly; and
    D) a friction member.

2. The cable with magnetic mounting assembly set forth in claim 1, further characterized in that said lower lateral wall comprises a lower cutout.

3. The cable with magnetic mounting assembly set forth in claim 2, further characterized in that said upper lateral wall comprises an upper cutout.

4. The cable with magnetic mounting assembly set forth in claim 3, further characterized in that said cable support assembly comprises first and second support spacers.

5. The cable with magnetic mounting assembly set forth in claim 4, further characterized in that said first and second support spacers define a cavity between them.

6. The cable with magnetic mounting assembly set forth in claim 5, further characterized in that said lower cutout and said upper cutout define a hole that aligns with said cavity to receive a cable therethrough.

7. The cable with magnetic mounting assembly set forth in claim 1, further characterized in that said upper lateral wall comprises a protrusion.

8. The cable with magnetic mounting assembly set forth in claim 7, further characterized in that said cover assembly closes by positioning said clasp onto said protrusion.

9. The cable with magnetic mounting assembly set forth in claim 1, further characterized in that said lower lateral wall and said upper lateral wall are joined by a hinge.

10. The cable with magnetic mounting assembly set forth in claim 1, further characterized in that said magnet assembly comprises a magnet and a magnet support.

11. The cable with magnetic mounting assembly set forth in claim 10, further characterized in that said friction member comprises a ring base with elongated protrusions.

12. The cable with magnetic mounting assembly set forth in claim 11, further characterized in that said friction member is mounted internally within said cover assembly, and said elongated protrusions protrude from said elongated slots.

13. The cable with magnetic mounting assembly set forth in claim 11, further characterized in that said cover assembly comprises a notch, which fits onto said ring base.

14. The cable with magnetic mounting assembly set forth in claim 10, further characterized in that said magnet is positioned onto said magnet support, and said magnet support is positioned onto said cable support assembly.

15. The cable with magnetic mounting assembly set forth in claim 10, further characterized in that said concave face is mounted onto any surface attracted to said magnet.

16. The cable with magnetic mounting assembly set forth in claim 1, further characterized in that said cover assembly covers said cable support assembly, said magnet assembly, and said friction member.

* * * * *